(12) United States Patent
Braghiroli et al.

(10) Patent No.: US 8,967,223 B2
(45) Date of Patent: Mar. 3, 2015

(54) METHOD FOR MOUNTING A TYRE ON A RIM OR DEMOUNTING A TYRE FROM A RIM AND APPARATUS THEREFORE

(75) Inventors: Francesco Braghiroli, Reggio Emilia (IT); Norberto Castagnoli, Corregio (IT)

(73) Assignee: Snap-On Equipment SRL A Unico Socio, Corregio (RE) (IT)

( * ) Notice: Subject to any disclaimer, the term of this patent is extended or adjusted under 35 U.S.C. 154(b) by 471 days.

(21) Appl. No.: 13/013,249

(22) Filed: Jan. 25, 2011

(65) Prior Publication Data
US 2011/0181099 A1 Jul. 28, 2011

(30) Foreign Application Priority Data
Jan. 25, 2010 (EP) .................................. 10000720

(51) Int. Cl.
*B60C 25/132* (2006.01)
*B60C 25/05* (2006.01)

(52) U.S. Cl.
CPC .......... *B60C 25/132* (2013.01); *B60C 25/0548* (2013.01)
USPC ....................................................... 157/1.1

(58) Field of Classification Search
CPC ...... B60B 31/00; B60C 25/05; B60C 25/053; B60C 25/0548; B60C 25/0554; B60C 25/056; B60C 25/132; B60C 25/138; B29D 2030/546
USPC ............... 157/1, 1.1, 1.17, 1.2, 1.22, 1.24, 11
See application file for complete search history.

(56) References Cited

U.S. PATENT DOCUMENTS

| 5,196,772 | A  | * | 3/1993 | Kupka et al. | .................... 157/1.1 |
| 5,657,673 | A  | * | 8/1997 | Fukamachi et al. | ......... 157/1.17 |
| 6,227,277 | B1 | * | 5/2001 | Corghi | ........................ 157/1.24 |
| 6,659,153 | B1 |   | 12/2003 | Kupka | |
| 7,040,371 | B2 | * | 5/2006 | Mory et al. | ....................... 157/1 |
| 2004/0200579 | A1 |   | 10/2004 | Mory et al. | |

FOREIGN PATENT DOCUMENTS

| DE | 40 28 080 A1 | 3/1992 |
| DE | 42 05 045 C1 | 8/1993 |
| DE | 4205045 C1 | 8/1993 |

(Continued)

OTHER PUBLICATIONS

European Search Report and European Search Opinion issued in European Patent Application No. 10000720.2, dated Jul. 6, 2010.

(Continued)

*Primary Examiner* — Hadi Shakeri
(74) *Attorney, Agent, or Firm* — McDermott Will & Emery LLP

(57) ABSTRACT

The invention relates to a method for controlling a current fed to an electric motor during an operation to mount a tire on a rim of a wheel including the tire and the rim, or to demount the tire from the rim. The wheel is rotated by an electric motor about an axis, and the motor current fed to the electric motor is controlled dependent on the rotational speed and torque required for the mounting and/or demounting operation. The motor current is automatically changed to cause the electric motor to apply a high torque peak to rotate the wheel, when the motor current is measured to be greater than a preset limit at a low rotational speed during a preset time. Furthermore, the invention relates to an apparatus for mounting a tire on a rim or demounting the tire from the rim.

11 Claims, 2 Drawing Sheets

(56) References Cited

FOREIGN PATENT DOCUMENTS

Figure 1:
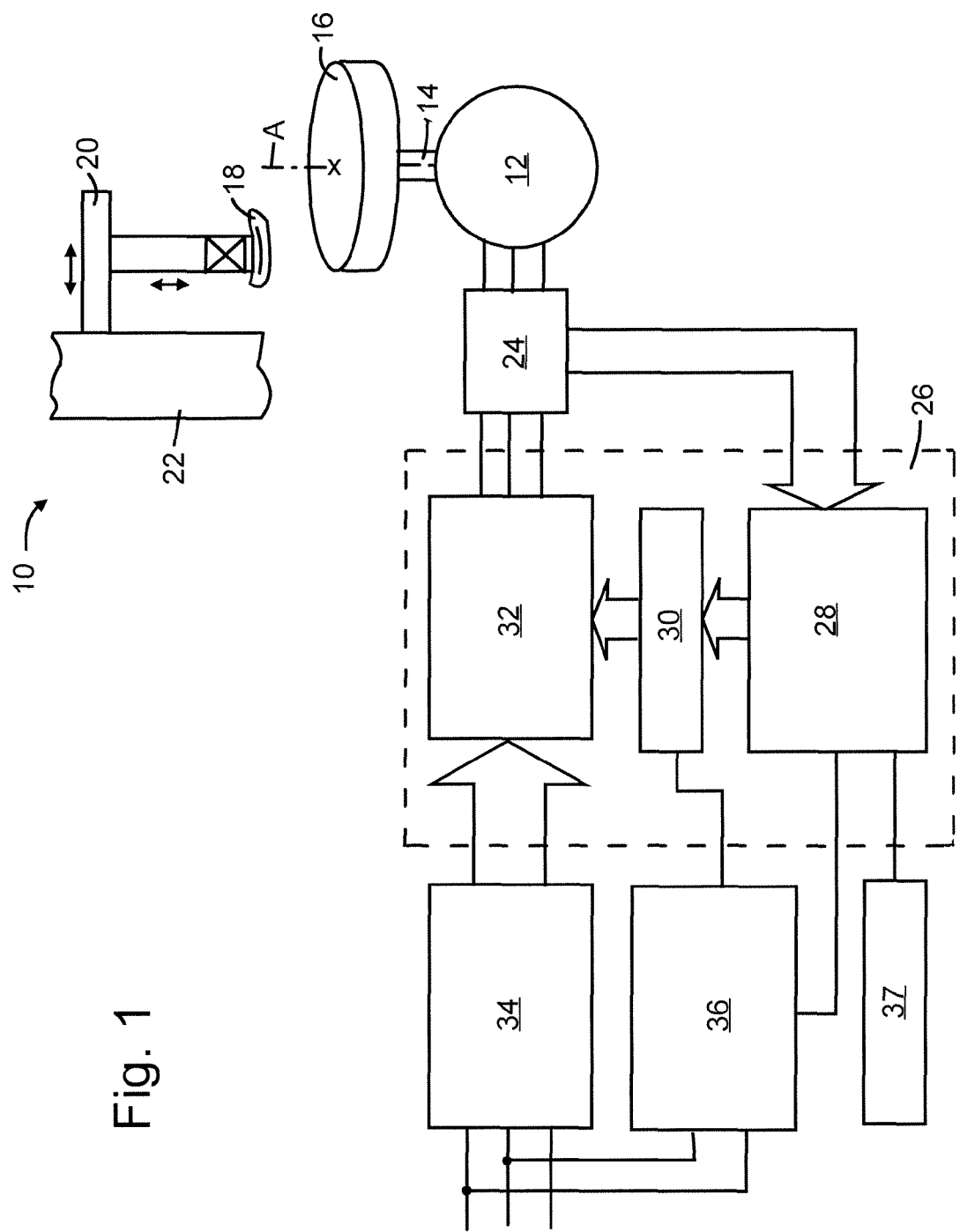

| | | |
|---|---|---|
| EP | 0 911 190 A1 | 9/1998 |
| EP | 1 247 661 A2 | 10/2002 |

OTHER PUBLICATIONS

English translation of Chinese Office Action issued in Chinese Application No. 201010552161.3 dated Feb. 8, 2014.

* cited by examiner though the motor is a two-phase or a three-phase electric motor, i.e. the electric motor is driven with two-phase current or three-phase current.

METHOD FOR MOUNTING A TYRE ON A RIM OR DEMOUNTING A TYRE FROM A RIM AND APPARATUS THEREFORE

CROSS-REFERENCE TO RELATED APPLICATION

This application claims foreign priority benefits under 35 U.S.C. §119(a)-(d) or (f) to European Patent Application No. 10 000 720.2-2425, filed on Jan. 25, 2010, in the European Patent Office, the disclosure of which is incorporated herein by reference in its entirety.

FIELD OF THE INVENTION

The invention concerns a method for mounting a tyre on a rim or demounting a tyre from a rim. Furthermore, the invention concerns an apparatus for mounting a tyre on a rim or demounting a tyre from a rim.

DESCRIPTION OF RELATED ART

An apparatus for mounting a tyre on a rim or demounting a tyre from a rim with an electric motor which drives a shaft of a rotary disc is already known from the prior art. For example EP 0 911 190 discloses such an apparatus. Thereby, an electric motor is used which can be powered with different supply voltages as the supply voltage differs for different countries. An apparatus for mounting a tyre on a rim or demounting a tyre from a rim according to the preamble of claims 1 and 7 is shown in DE 42 05 045; especially DE 42 05 045 shows a rim or a tyre being positioned on the rotary disc. By means of a tyre fitting or removal tool the tyre is mounted on the rim or demounted from the rim. The electric motor is activatable by a foot pedal. By a corresponding more or less activation of the foot pedal an operator is able to change the motor torque and thus the movement of the rotary disc.

SUMMARY

The invention provides a method for mounting a tyre on a rim or demounting a tyre from a rim, wherein the wheel (tyre/rim assembly) is rotated by an electric motor about an axis, wherein the motor current fed to the electric motor is controlled dependent on the rotational speed and torque required for the mounting and/or demounting operation, and wherein the motor current is automatically changed to apply a high torque peak, when the measured motor current is greater than a preset limit at a low rotational speed during a preset time. According to the invention, it is autonomously detected when a high torque peak is required and such a high torque peak is automatically applied. The high torque peak is achieved in changing the motor current, in particular in changing the frequency and/or the amplitude of the motor current. The applied high torque peak is also called "boost" function in the following. The "boost" function is synonymous with an activation of a pedal with which the electric motor is started. That means the "boost" function simulates a pedal retry of an operator in increasing the motor current fed to the electric motor. Such a motor current changing is useful as speed and torque requirements during mounting and/or demounting operations are different depending on the kind of the mounted and/or demounted tyre. In particular, the side walls of the tyres have different stiffness. For tyres with a high stiffness, e.g. run flat tyres, low speed and high torque are required, however for basic operations high speed and low torque are required. Advantageously, the method according to the invention prevents the tyres from damage during mounting and/or demounting process. The high torque peak is applied to the electric motor when the present current is greater than a preset limit at a low rotational speed during a preset time. The actual low speed corresponds e.g. to the nominal speed of the motor at 50 Hz (which approximately corresponds to 1500 rpm for a standard four-pole motor). The speed of the motor is reduced by means of a gearbox to about 7 rpm at the main shaft. That means when the shaft rotated by the electric motor is slowed down due to a high request of torque at a low rotational speed and this high request of torque exists during a preset time, the motor current is changed.

Preferably, the preset time is longer than the period during which the high torque peak is applied.

In particular, the preset time is three to ten times longer than the period of applying the torque peak.

The motor current is preferably set back to normal condition after applying the torque peak. After applying the torque peak, the method for mounting or demounting a tyre is continued with the motor current for normal conditions until a further high request of torque is detected by the converter. For example, the actual low speed corresponds to the nominal speed of the motor at 50 Hz—which approximately corresponds to 1500 rpm for a standard four-pole motor—and the actual high speed corresponds to the nominal speed of the motor at 100 Hz—which approximately corresponds to 3000 rpm for a standard four-pole motor. The actual low speed of the motor is reduced by means of a gearbox to about 7 rpm at the main shaft, and the actual high speed of the motor is reduced by means of a gearbox to about 14 rpm at the main shaft.

Preferably, the frequency and/or the amplitude of the motor current is increased within a preset maximum limit to apply a torque peak. Such a preset limit is given, e.g. stored, and prevents that the electric motor is driven with an excessive current frequency which leads to a damage of the electric motor.

The cycle of applying the torque peak and setting back to normal condition can be repeated.

Furthermore, the invention relates to an apparatus for mounting a tyre on a rim or demounting a tyre from a rim comprising an electric motor for rotating the wheel (rim/tyre assembly) about an axis, a controlled device for delivering the motor current to the electric motor and a sensing device for sensing the motor current and transmitting corresponding signals to a control device controlling the motor current dependent on the rotational speed and torque requirement for the mounting and/or demounting operation, wherein the control device is able to change the motor current to apply a high torque peak, when the measured motor current is greater than a preset limit at a low rotational speed during a preset time. With respect to the advantages it is referred to the above mentioned explanations.

Preferably, a time counter is connected to the control device to predetermine a time limit interval during which a motor current greater than a preset limit is measured. Thereby, the time counter can be a separate part or the time counter can be integrated into the control device.

The control device can comprise a microprocessor which adjusts a power driving circuit with power switches to control the motor current.

The electro motor is a two-phase or a three-phase electric motor, i.e. the electric motor is driven with two-phase current or three-phase current.

Preferably, the apparatus comprises a low voltage circuit providing the control device with low voltage.

BRIEF DESCRIPTION

Figure 2:
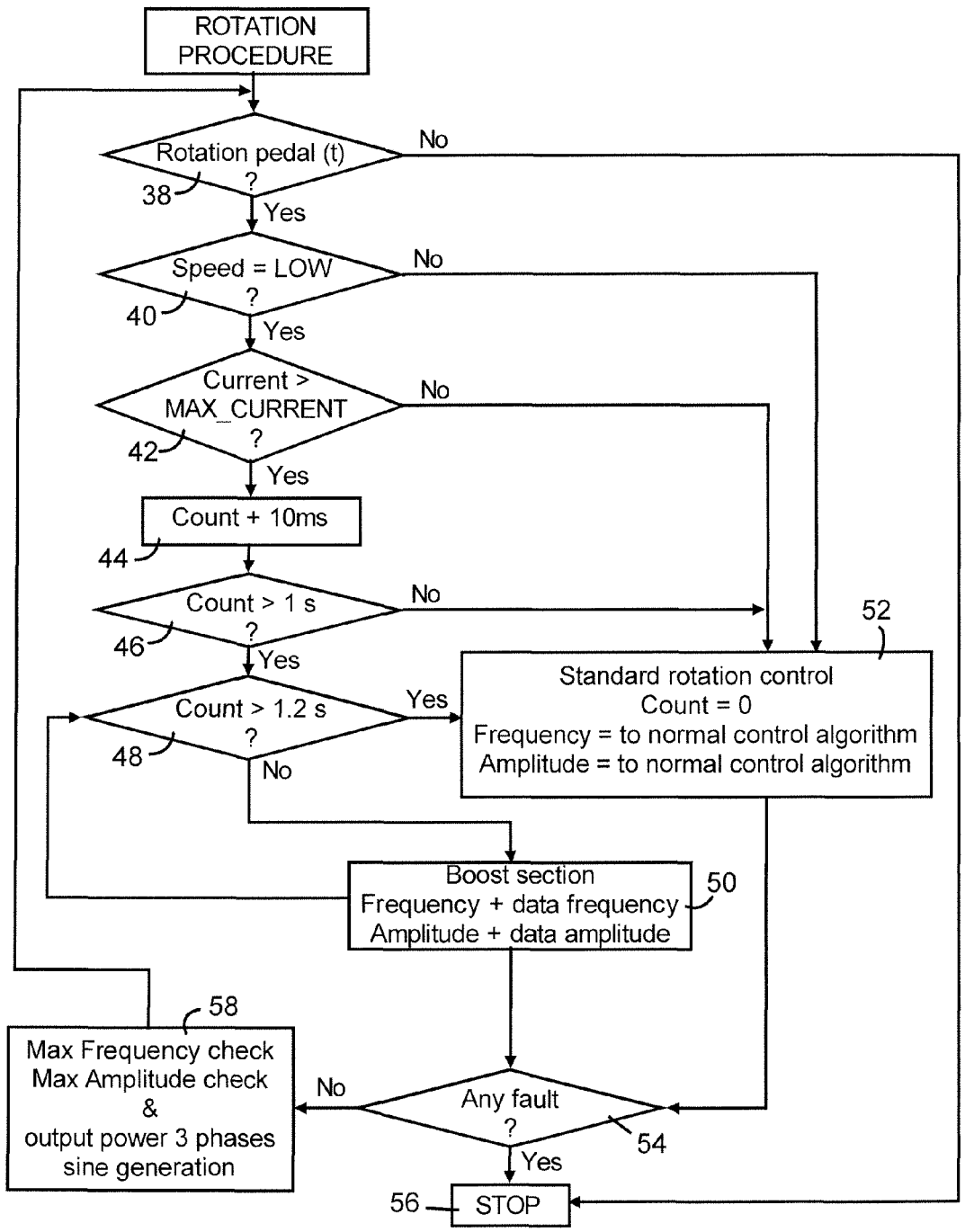

The invention will be described in greater detail hereinafter by means of embodiments by way of example with reference to the Figures in which:

FIG. 1 schematically shows an apparatus in which a method according to the invention can be conducted, and FIG. 2 shows a flow chart of the method according to the invention.

DETAILED DESCRIPTION

In FIG. 1 a tyre changer is diagrammatically shown, the tyre changer 10 comprising an electric motor 12, in particular three-phase motor, for driving a drive shaft 14 of a rotary disc 16. Alternatively, a one-phase motor or a two-phase motor, especially induction motor, can be used. In particular a four-pole motor is used. On the rotary disc 16 tyres being centred to the rotary axis A of the rotary disc 16 can be positioned. A tyre fitting or removal head 18 is fixed on a pivotable arm 20, the arm 20 being attached to a housing 22.

The motor current, especially the frequency and/or the amplitude of the motor current fed to the electric motor 12 is changeable which results in a different speed of the driven shaft 14. In order to detect the motor current fed to the electric motor 12, a sensing device 24 is connected with the electric motor 12. Furthermore, the sensing device 24 is connected with a control device 26. Signals from the sensing device 24 are transmitted to the control device 26. Depending on the signals detected from the sensing device 24, the control device 26 is able to control the motor current dependent on the rotational speed and torque requirement for the mounting and/or demounting operation. In particular, the control device 26 is able to change the frequency and/or the amplitude of the motor current fed to the electric motor 12. Such a changing in the motor current is useful as speed and torque requirements during mounting and/or demounting operations are different depending on the kind of the mounted and/or demounted tyre. In particular, the side walls of the tyres have different stiffness. For tyres with a high stiffness, e.g. run flat tyres, low speed and high torque are required, however for basic operations high speed and low torque are required. The control device 26 is able to autonomously detect, when the rotation of the shaft 14 is slowed down due to high request of torque, and is able to automatically start a so-called "boost" function. This "boost" function is synonymous with an activation of a pedal with which the electric motor 12 is started. That means the "boost" function simulates a pedal retry of an operator. This provides a torque peak of the electric motor 12. Thereby the current fed to the electric motor 12 is changed in increasing the motor current fed to the electric motor 12 within given limit values. The control device 26 autonomously detects a requirement of changing the motor current fed to the electric motor 12 to apply a high torque peak. After detecting the requirement, the motor current is automatically changed. An action of an operator is thereby not necessary.

The control device 26 comprises a microprocessor 28, an interface circuit 30 and a controlled device 32. The sensing device 24 is connected with the microprocessor 28, signals from the sensing device 24 indicating the motor current fed to the electric motor 12 being transmitted from the sensing device 24 to the microprocessor 28. Depending on these signals, the microprocessor 28 being able to adjust the controlled device 32 comprising power switches to control the motor current. The interface circuit 30 positioned between the microprocessor 28 and the controlled device 32 serves for converting and forwarding the commands of the microprocessor 28 to the controlled device 32. The interface circuit 30 provides voltage interface conversions, supplies dead time protection and shut down function protection. The controlled device 32 comprising power switches which are used to drive the electric motor 12 are positioned between the motor current sensing device 24 and a high voltage circuit 34, the high voltage circuit 34 powers the electric motor 12.

Furthermore, a low voltage circuit 36 is provided comprising a transformer to reduce the voltage, a bridge rectifier, filter and a regulator to provide low voltage levels being provided to the interface circuit 30 and to the circuit of the microprocessor 28.

Furthermore, a time counter 37 is provided, the time counter 37 being connected to the control device 26, especially the microprocessor 28, to predetermine a time limit interval during which a motor current which is greater than a preset limit is measured. When the measured motor current is greater than a preset limit during the preset time, a high torque peak is applied. Alternatively, the time counter 37 can be integrated into the control device (not shown).

A flow chart of the method according to the invention which is conducted with the apparatus as explained above is shown in FIG. 2.

In a first step, which is indicated with reference numeral 38, it is inspected if the foot pedal (not shown) is activated.

Only if the pedal is activated, that means if the first interrogation 38 can be answered with "yes", it is checked, in a second step 40, if the present speed of the electric motor 12 and thus of the drive shaft 14 is low. Thereby, a "low" speed means that the present speed is lower than a speed which is present with "normal" conditions. Values which represent the speed of several kinds of tyres with "normal" conditions can be entered and recalled. A "low" speed indicates a torque which exceeds the corresponding limit value. A "low" speed can be detected by the motor current sensing device 24 in an increase of the current of the electric motor 12. Alternatively, a "low" speed can be detected by a speed sensor (not shown) observing the speed of the drive shaft 14 or of the electric motor 12. Corresponding signals are sent by the motor current sensing device 24 or the speed sensor to the converter 26, in particular to the microprocessor 28 being part of the converter 26. For example, the actual low speed corresponds to the nominal speed of the motor at 50 Hz—which approximately corresponds to 1500 rpm for a standard four-pole motor—and the actual high speed corresponds to the nominal speed of the motor at 100 Hz—which approximately corresponds to 3000 rpm for a standard four-pole motor. The actual low speed of the motor is reduced by means of a gearbox to about 7 rpm at the main shaft, and the actual high speed of the motor is reduced by means of a gearbox to about 14 rpm at the main shaft.

If the present speed of the electric motor 12 and thus of the drive shaft 14 is low, e.g. the second interrogation 40 is answered with "yes", the present current of the electric motor 12 is compared with a maximum current in a third step 42. Thereby, it is checked, if the present current is greater than a maximum current. The present current of the electric motor 12 is measured by the motor current sensing device 24 and a corresponding signal is transmitted to the microprocessor 28. The microprocessor 28 compares the signal of the motor current sensing device 24, which corresponds to the measured current, with a stored limit value for the present kind of tyre and detects if the present current of the electric motor 12 is greater than the maximum current. Limit values for several kinds of tyres are stored in the microprocessor 28.

If the measured current of the electric motor 12 is greater than a preset limit, a time counter 37 starts (see step 44). If the measured current of the electric motor 12 persists for a preset time, e.g. for one second (see step 46), the "boost" function is started for about 0.2 seconds. In other words, the "boost" function is conducted as long as the interrogation "Count >1.2 s" can be answered with "no", i.e. as long as the elapsed time is smaller than 1.2 seconds the "boost" function is conducted (see steps 48, 50). Is the elapsed time greater than 1.2 seconds, the motor current is set back to normal condition (see step 52). As already explained above, the "boost" function is synonymous with an activation of the pedal with which the electric motor 12 is started. That means the "boost" function simulates a pedal retry of an operator which provides a torque peak of the electric motor 12. The frequency and/or the amplitude of the motor current fed to the electric motor 12 is changed, especially increased, within given limit values.

If there are detected any faults, the method is stopped (see steps 54, 56). Otherwise, the method starts again (see steps 54, 58).

Furthermore, the motor is driven with normal condition (see step 52), if the present speed of the electric motor 12 and thus of the drive shaft 14 is not low (i.d. interrogation 40 is answered with "no"), if the present current is lower than a maximum current (i.d. interrogation 42 is answered with "no") and if the measured current is for less than 1 s greater than the maximum current (i.d. interrogation 46 is answered with "no"). Furthermore, if the pedal is not activated (see step 38), the method is stopped (see step 56).

According to the inventive method, it is autonomously detected, when the speed of the electric motor 12 and thus of the drive shaft is slowed down due to high request of torque, and the "boost" function is automatically started. Thereby, the frequency and/or the amplitude of the current fed to the electric motor 12 is increased within maximum limits. This "boost" function simulates a pedal retry of an operator and provides a torque peak of the electric motor 12.

The invention claimed is:

1. A method for controlling a current fed to an electric motor during an operation to mount a tyre on a rim of a wheel including the tyre and the rim or demount the tyre from the rim, the method comprising:
   rotating the wheel including the tyre and the rim about an axis using the electric motor having a motor current fed thereto,
   controlling, by a control device coupled to the electric motor, the motor current fed to the electric motor dependent on a rotational speed and torque required for the mounting or demounting operation, and
   automatically changing the motor current by the control device, to cause the electric motor to apply a high torque peak to rotate the wheel, when, at a low rotational speed of the wheel, a time interval, during which the motor current is greater than a preset limit, exceeds a preset time period.

2. The method according to claim 1, wherein the preset time is longer than a period during which the high torque peak is applied.

3. The method according to claim 1, wherein the preset time is three to ten times longer than a period during which the high torque peak is applied.

4. The method according to claim 1, wherein the motor current is set back to normal condition after applying the torque peak.

5. The method according to claim 4, wherein a cycle of applying the torque peak and setting back to normal condition is repeated.

6. The method according to claim 1, wherein a frequency and/or an amplitude of the motor current is increased within a preset maximum limit to apply a torque peak.

7. The method according to claim 1, wherein a time counter integrated into the control device determines when the time interval, during which the motor current is greater than the preset limit, exceeds the preset time period.

8. An apparatus for mounting a tyre on a rim of a wheel including a tyre and a rim, or demounting the tyre from the rim comprising:
   an electric motor for rotating the wheel including the tyre and the rim about an axis,
   a control device for delivering a motor current to the electric motor,
   a sensing device for measuring the motor current and transmitting corresponding signals to the control device controlling the motor current dependent on a rotational speed and torque requirement for the mounting or demounting operation,
   wherein the control device is configured to automatically change the motor current to cause the electric motor to apply a high torque peak to rotate the wheel, when the motor current is measured to be greater than a preset limit at a low rotational speed during a preset time, and
   a time counter integrated into the control device to determine when a time interval during which the motor current is greater than the preset limit exceeds the preset time.

9. The apparatus according to claim 8, wherein the control device comprises a microprocessor which adjusts power switches operative to control the motor current.

10. The apparatus according to claim 8, wherein the electric motor is a two-phase or three-phase electric motor.

11. The apparatus according to claim 8, wherein the apparatus comprises a low voltage circuit providing the control device with low voltage.

* * * * *